United States Patent
Alimpich et al.

(12)

(10) Patent No.: US 6,181,340 B1
(45) Date of Patent: Jan. 30, 2001

(54) DATA PROCESSOR CONTROLLED DISPLAY SYSTEM FOR THE CONTROL OF OPERATIONS WITH PROPERTIES WHICH ARE CONSTANT OR VARIABLE

(75) Inventors: Claudia Alimpich, Boulder; Gerald Donald Boldt; Calvin Larry Doescher, both of Longmont; Joan Stagaman Goddard; James Philip John Wittig, both of Boulder, all of CO (US)

(73) Assignee: International Business Machines Corporation, Armonk, NY (US)

( * ) Notice: Under 35 U.S.C. 154(b), the term of this patent shall be extended for 0 days.

(21) Appl. No.: 09/053,207

(22) Filed: Mar. 31, 1998

(51) Int. Cl.[7] .................................................. G06F 3/00
(52) U.S. Cl. ............................ 345/352; 345/350; 345/965
(58) Field of Search ................................... 345/349, 965, 345/970, 352, 353, 188, 350, 975, 337, 333

(56) References Cited

U.S. PATENT DOCUMENTS

| | | | |
|---|---|---|---|
| 5,425,140 | * | 6/1995 | Bloomfield et al. .................. 345/353 |
| 5,481,668 | * | 1/1996 | Marcus .................................. 345/349 |
| 5,818,444 | * | 10/1998 | Alimpich et al. ..................... 345/333 |
| 5,825,361 | * | 10/1998 | Rubin et al. .......................... 345/349 |
| 5,874,955 | * | 2/1999 | Rogowitz et al. .................... 345/339 |

* cited by examiner

*Primary Examiner*—Raymond J. Bayerl
*Assistant Examiner*—Cuong T. Thai
(74) *Attorney, Agent, or Firm*—Julius B. Kraft; David W. Victor; Konrad Raynes & Victor LLP

(57) ABSTRACT

A data processing controlled display system for the interactive control of a variety of production operations is provided which offers to an operator or to a production supervisor the means for simplifying complex interactive display interfaces, thereby significantly reducing the number of production operations properties over which the operator has control. In this reduction, all of the operator controllable properties are displayed to the user or operator, and means for selecting a plurality of these controllable properties for interactive operator control of variable property values during said production operations are provided. Upon such a selection, there are further means for maintaining the non-selected properties at constant values during said production operations. These constant value properties remain hidden from the interface and the operator is presented with a simplified interface showing only the properties of which the values are controllable.

22 Claims, 6 Drawing Sheets

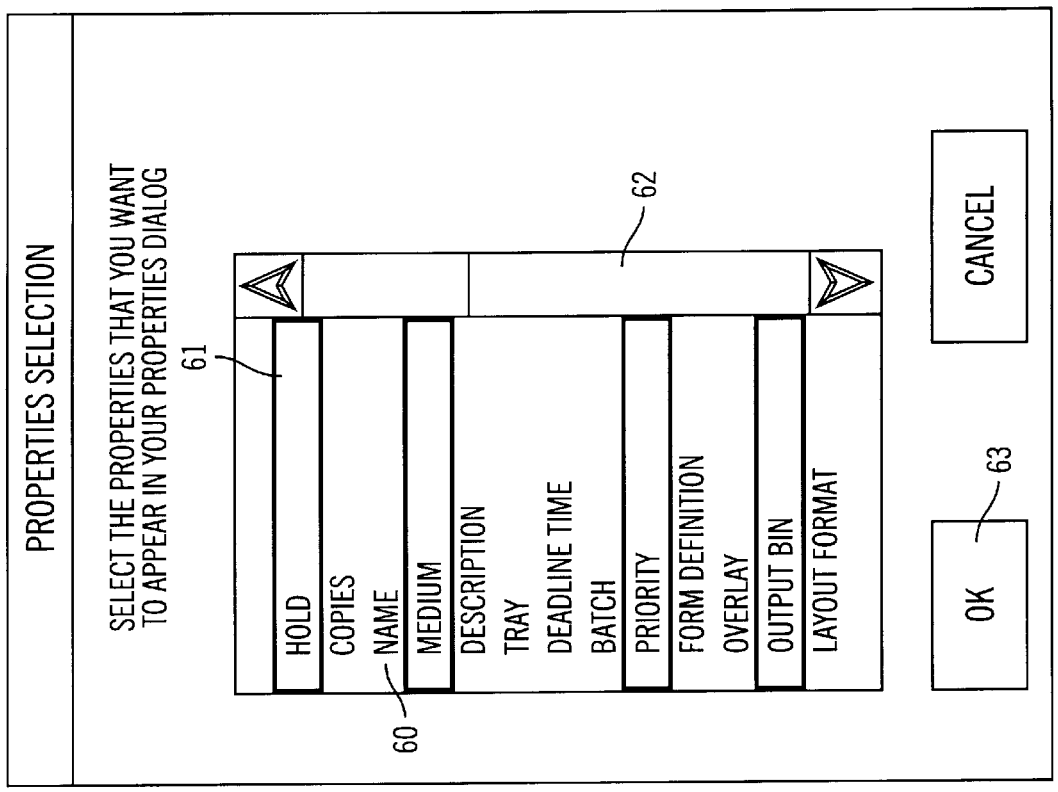
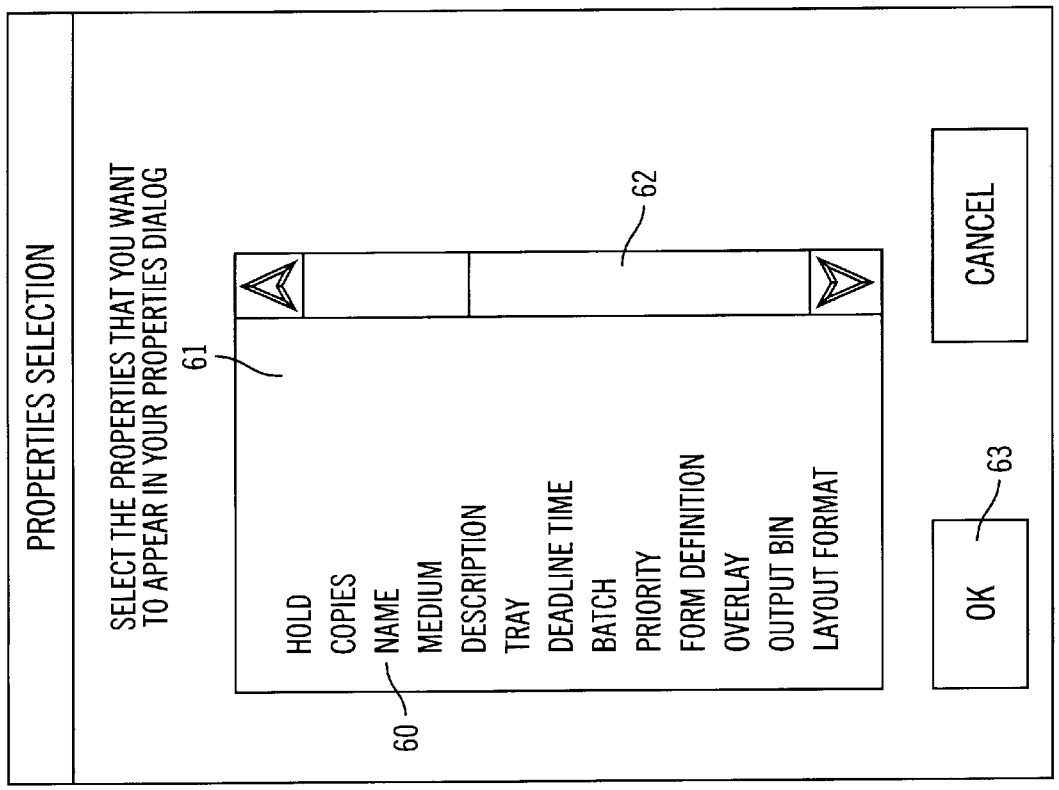
FIG. 3B
FIG. 3A

DATA PROCESSOR CONTROLLED DISPLAY SYSTEM FOR THE CONTROL OF OPERATIONS WITH PROPERTIES WHICH ARE CONSTANT OR VARIABLE

CROSS-REFERENCE TO RELATED COPENDING PATENT APPLICATIONS

The following patent applications which are assigned to the assignee of the present invention cover subject matter related to the subject matter of the present invention: "Data Processor Controlled Display System With a Plurality of Selectable Basic Function Interfaces for the Control of Varying Types of Customer Requirements and With Additional Customized Functions", Attorney Docket No. AM9-97-153; "Data Processor Controlled Display System With a Plurality of Switchable Customized Basic Function Interfaces for the Control of Varying Types of Operations", Attorney Docket No. AM9-97-155; "Data Processor Controlled Display Interface With Tree Hierarchy of Elements View Expandable into Multiple Detailed Views", Attorney Docket No. AM9-97-157; "Data Processor Controlled Interface with Multiple Tree of Elements Views Expandable into Individual Detail Views", Attorney Docket No. AM9-97-158; "Data Processor Controlled Display With a Tree of Items With Modification of Child Item Properties Designated at Parent Level Without Modification of Parent Item Properties", Attorney Docket No. AM9-97-159; and "Data Processor Controlled Display System With a Tree Hierarchy of Elements View Having Virtual Nodes", Attorney Docket No. AM9-97-160; all are assigned to International Business Machines Corporation by Claudia Alimpich et al. and all are filed concurrently herewith.

TECHNICAL FIELD

The present invention relates to interactive computer controlled display systems for controlling operations and particularly to user friendly display interfaces for the control of such operations when operators of limited computer skills are controlling repetitive operations.

BACKGROUND OF THE INVENTION

Computer application programs are used in all aspects of business, industry and academic endeavors. There is a large and diverse segment of workers and consumers that must interface with these applications. Conventionally the developer of an application program must target a skill level of a group of potential users so as to create the optimum "ease of use" interface. Of necessity there has to be some trade-off between increased function versus such ease of use, i.e. the greater the operator's control, the more complex the interface. Usually the program developer has to anticipate the level of this trade-off.

Nowhere does the program developer's choices in designing interfaces have a greater impact than in the control of production operations. This vast area includes the printing trades, the production of parts, tools and dies, integrated circuit manufacturing and processing and chemical industry production as just a few examples. Because such production involves repetitive functions continuously performed over relatively long periods of time, the computerization of such operations takes advantage of the strengths of the computer. With the advance of computer control in production, the operator skill levels required for many operations has been reduced, and in areas where high production skills are still required, the productivity of skilled workers has been greatly increased.

However, with this ever increasing use of computer functions in production operations comes an attendant downside which must be dealt with. The display interfaces through which the operators must control the production could become more and more complex with up to hundreds of functional options and dozens of system levels. The result is the productive times and more limited skills of the lower skilled operators may be drained in computer functions, and the creative energies of the workers skilled in the production technologies exhausted in such computer functions with the result that their technical skills are diminished.

Some production operations have found a solution to this problem through the use of various software development and service organizations to design specific purpose software programs with specific display interfaces tailored to the specific production needs and operator skills. This approach may be viable in production operations where the runs are long term and of the same type with few changes. However, it is likely to be too expensive to production organizations such as large scale printing operations which have to deal with a variety of modified operations from job to job.

Copending application, "Data Processor Controlled Display System With a Plurality of Selectable Basic Function Interfaces for the Control of Varying Types of Customer Requirements and With Additional Customized Functions", Claudia Alimpich et al. (Attorney Docket No. AM9-97-153), assigned to the same assignee as the present invention and filed on the same day as the present invention offers a solution to the above problems by providing production operations control program which may be distributed "off-the-shelf" and provides the user with a plurality of basic ease-of-use interfaces each respectfully directed to a different type of production operation together with the means to readily customize the selected interface through the addition of selected functions.

SUMMARY OF THE INVENTION

The present invention offers the further implementation of providing universal operations control programs which may be sold "off-the-shelf". The programs provide the operator at the controlling interactive display terminal or the production operations supervisor with the capability of selecting from among the dozens of properties involved in the control of the operations. Those properties which are to be controlled as variables during the current production operations and those properties which are to be preset to fixed constant values during the control of the current operations or during the control of particular jobs being currently performed in the overall operations. Of course, the properties chosen to be controllable and those chosen to remain fixed during the current operation or job may subsequently be changed by the operator for subsequent operations or jobs.

With this capability, the production control properties may preset to constant values or be permitted to remain controllable variables dependent upon the needs of a production run or of the individual jobs in that run. In other words, the present invention makes possible the following trade-off: the greater the number of control properties permitted to remain controllable variables, the more precise will be the control of the operation. However, too many variables will present a much more complex display interface for control of the operations which would be likely to confuse and impede operators of lower skill levels. Thus, with lower skill level operators, only an essential few of the control properties would be permitted to be controllable variables while most of the control properties would be fixed at constant or default levels. Some precision and fine tuning of properties would be conceded in return for an interface which would be greatly simplified for the lower skilled operator.

The present invention relates to a data processor controlled display system for the interactive control of operations comprising means for displaying a group of interactively controllable properties of said operations together with means for selecting a plurality of said controllable properties for interactive operator control of variable property values during said operations. The nonselected properties are maintained at constant values during said production operations. The user is then provided with a simple display interface for controlling the production operations which shows the user controllable representations of each of said selected plurality of controllable properties, while the properties which are to remain constant are absent from the display interface. The initial selection of the properties which are to remain controllable is made by displaying representations of the group of interactively controllable properties in a scrollable graphical interface, and interactively selecting the properties which are to remain controllable from the representations in said scrollable interface.

BRIEF DESCRIPTION OF THE DRAWINGS

FIG. 3A is a diagrammatic view of a portion of a display screen on which a menu for the interactive selection of a plurality of types of properties which will be chosen for operator control;

FIG. 3B is the menu on the display screen interface of FIG. 3A after a plurality of properties have been selected for operator control;

DETAILED DESCRIPTION OF THE PREFERRED EMBODIMENT

Figure 1:
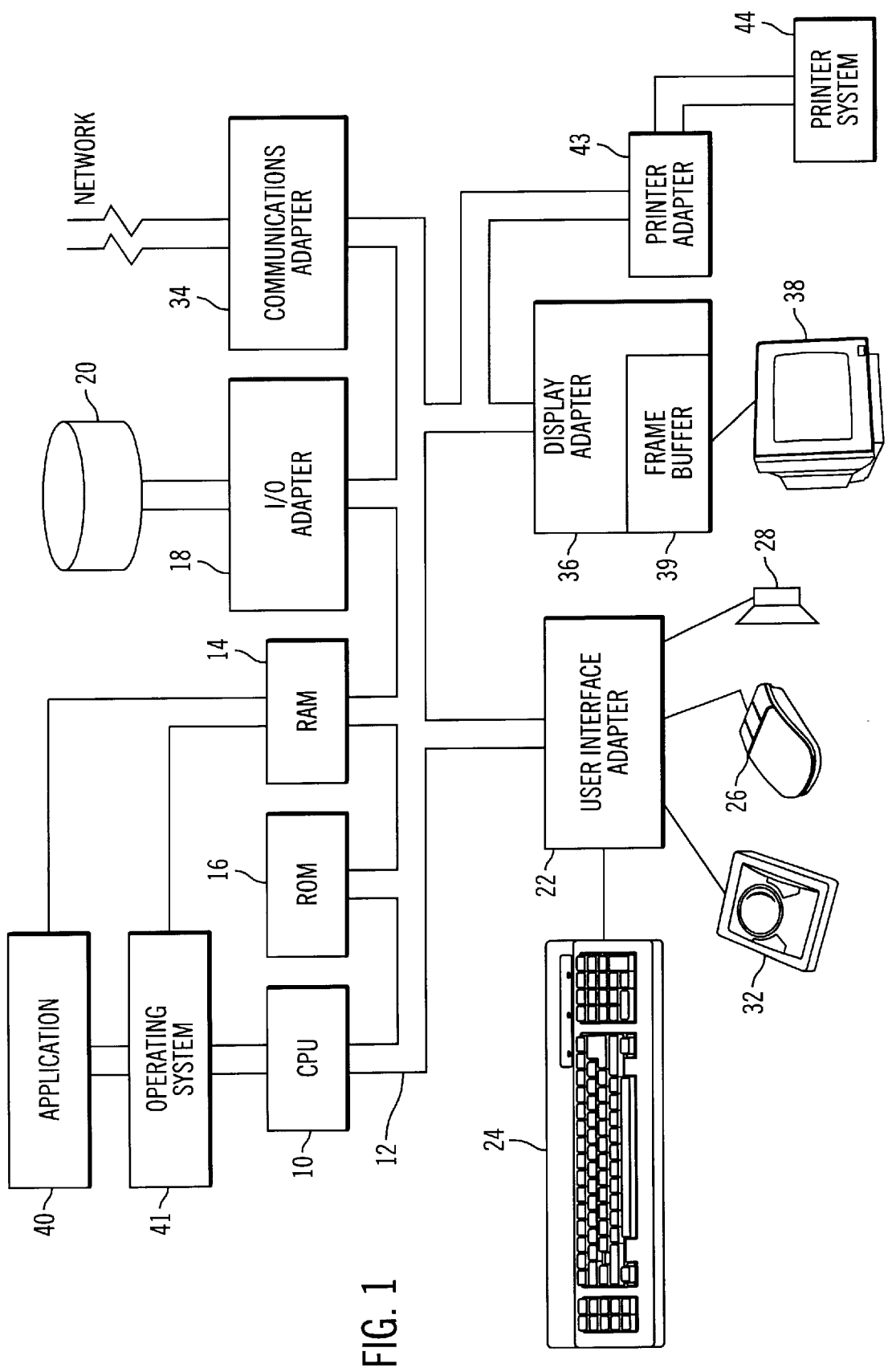
FIG. 1 is a block diagram of an interactive data processor controlled display system including a central processing unit which is capable of implementing the production operations control program of the present invention.

Referring to FIG. 1, a typical data processing system is shown which may function as the computer controlled display terminal used in implementing the selectable property control functions in the present invention. A central processing unit (CPU) such as one of the PC microprocessors available from International Business Machines Corporation is provided and interconnected to various other components by system bus 12. An operating system 41 runs on CPU 10 and provides control and is used to coordinate the function of the various components of FIG. 1. Operating system 41 may be one of the commercially available operating systems such as DOS or the OS/2 operating systems available from International Business Machines Corporation (OS/2 is a trademark of International Business Machines Corporation); Microsoft's Windows95(™) or Windows NT(™) as well as Unix and AIX operating systems. A programming application for monitoring and controlling a production operation, application 40, to be subsequently described in detail, runs in conjunction with operating system 41 and provides output calls to the operating system 41 which implement the various functions to be performed by the application 40.

A read only memory (ROM) 16 is connected to CPU 10, via bus 12 and includes the basic input/output system (BIOS) that controls the basic computer functions. Random access memory (RAM) 14, I/O adapter 18 and communications adapter 34 are also interconnected to system bus 12. It should be noted that software components including the operating system 41 and the application 40 are loaded into RAM 14 which is the computer system's main memory. I/O adapter 18 may be a small computer system interface adapter that communicates with the disk storage device 20, i.e. a hard drive. Communications adapter 34 interconnects bus 12 with an outside network enabling the data processing system to communicate with other such systems over a local area network (LAN) to control production operations. I/O devices are also connected to system bus 12 via user interface adapter 22 and display adapter 36. Keyboard 24, trackball 32, mouse 26 and speaker 28 are all interconnected to bus 12 through user interface adapter 22. It is through such input devices that the user interactive functions involved in the displays of the present invention may be implemented. Display adapter 36 includes a frame buffer 39 which is a storage device that holds a representation of each pixel on the display screen 38. Images may be stored in frame buffer 39 for display on monitor 38 through various components such as a digital to analog converter (not shown) and the like. By using the aforementioned I/O devices, a user is capable of inputting information to the system through the keyboard 24, trackball 32 or mouse 26 and receiving output information from the system via speaker 28 and display 38. In the preferred embodiment, which will be subsequently described, the production operation will be the control of selectable properties of high throughput printers such as electrophotographic or laser printers. A local printer system 44 may be accessed and controlled via printer adapter 43 while networked printers may be communicated with via communications adapter 34.

Figure 4:
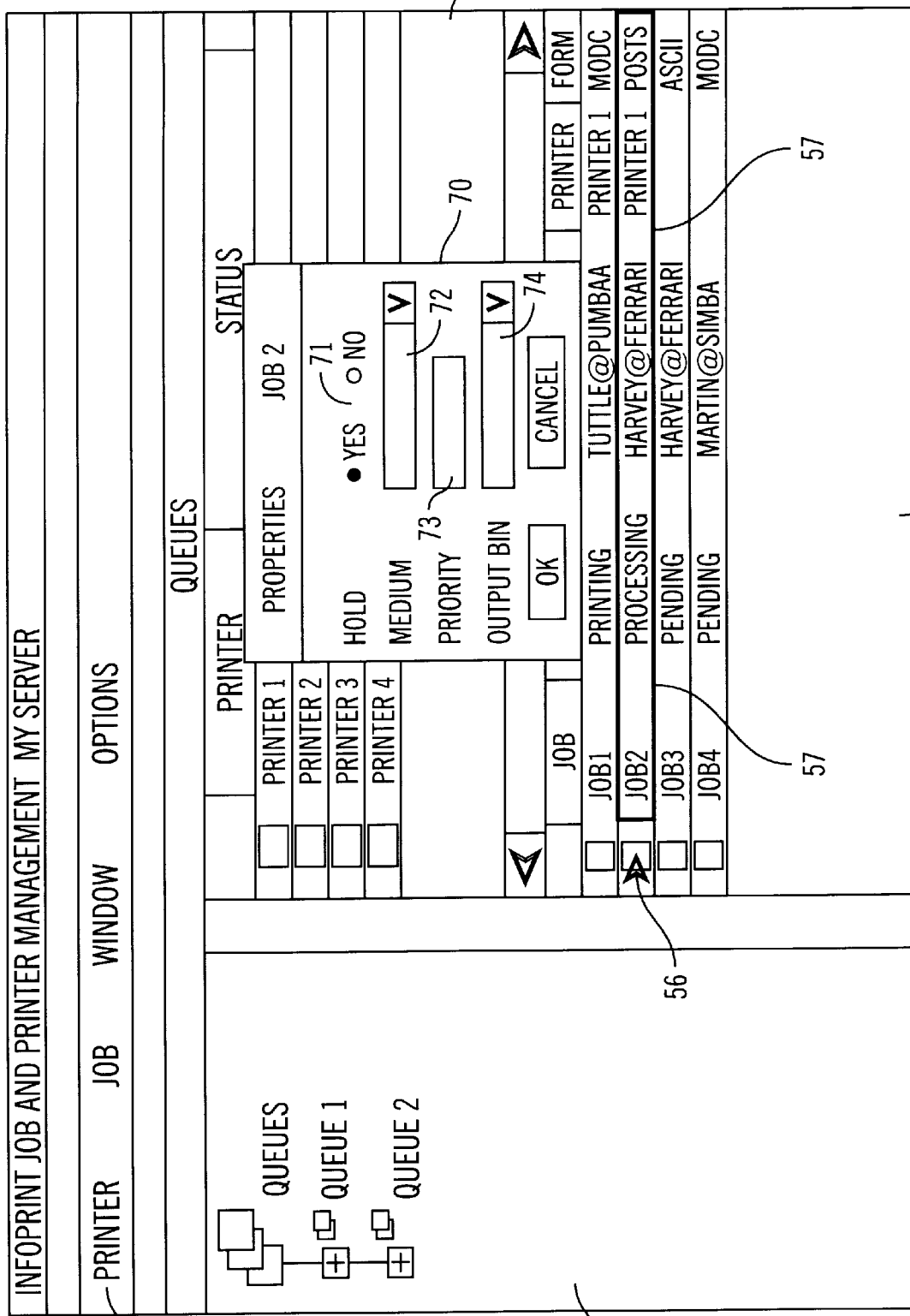
FIG. 4 is the same diagrammatic view of the display screen of FIG. 2 after the interface for interactive operator control of the selected properties has been activated.

There will now be described a simple illustration of the present invention with respect to the display screens of FIGS. 2 through 4. When the screen images are described, it will be understood that these may be rendered by storing an image and text creation programs such as those in any conventional window operating system in the RAM 14 of the system of FIG. 1. The operating system is diagrammatically shown in FIG. 1 as operating system 41. An embodiment of the present invention will be described commencing with the display screen shown in FIG. 2. This initial display screen is presented to the viewer on display monitor 38 of FIG. 1. In accordance with conventional techniques, the user may control the screen interactively through a conventional I/O device such as mouse 26 of FIG. 1 which operates through user interface 22 to call upon programs in RAM 14 cooperating with the operating system 41 to create the images in frame buffer 39 of display adapter 36 to control the display on monitor 38.

Figure 2:
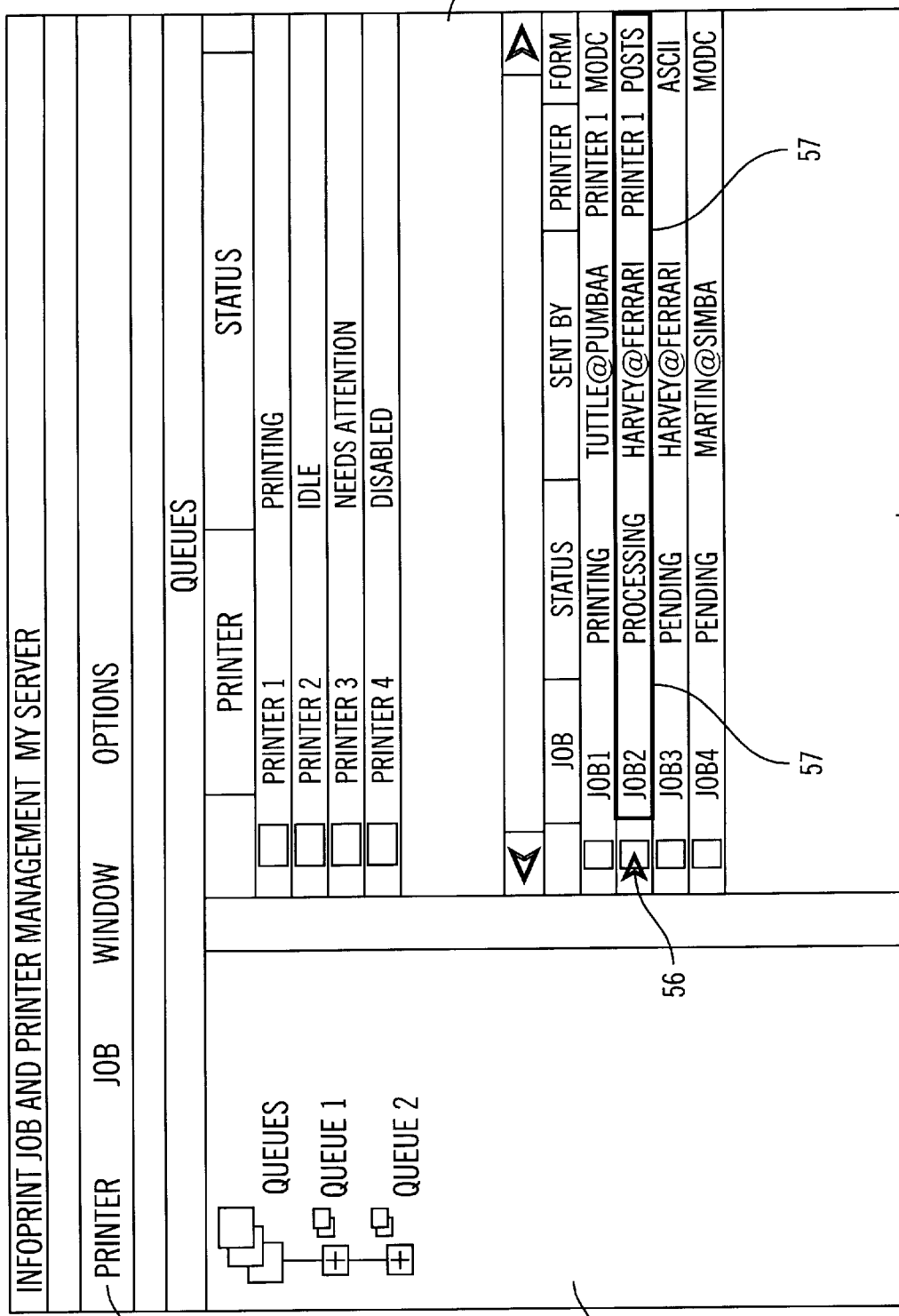
FIG. 2 is a diagrammatic view of a portion of a display screen which may be used in the control of a representative type of printer operation, network printer production operations.

FIG. 2 shows a diagrammatic view of a display interface which may be used to control printer operations. The display screen presents the status of the printers, window 51, the status of jobs, window 52 and the individual printer queues, window 53. There is also a menu bar 54 from which various printer and job functions may be initiated. In the interface shown, the job function has been chosen which activates window 52, and "Job 2" has been activated as shown by pointer 56 and has been accordingly highlighted 57. Accordingly, the properties selected for interactive control will, in this case, be applicable for Job 2. While here, the properties for control are being selected after the particular job has been selected. It should be understood that it is often the case that, as mentioned above, the properties which are to be controllable are selected well in advance of job selection. Such preliminary selection of controllable properties may be done by an operations supervisor and is dependent on the skills of the operator or the level of the equipment. In any event, the properties which will be controllable are selected through an interface such as that of FIG. 3A. The dozens of controllable properties are scrolled through in a property window 61 through the interactive use of a scroll bar. A plurality of the properties may be selected for control by pointing to them while scrolling through and clicking on them with the previously mentioned pointing devices, e.g. mouse. When all of the choices have been made, the OK button 63 is activated to set the choices. In this example, the choices made are shown with respect to FIG. 3B which shows the "Hold", "Medium", "Priority" and "Output bin" properties chosen and thus highlighted. As a result, the operator will be permitted to control the variable values of these four properties. All of the nonchosen properties will be set at constant or default values and not even shown to the operator in the properties control window 70, FIG. 4 which will be activated to provide the operator with an interface for controlling the four selected properties shown: Hold, Medium, Priority and Output bin, along with their respective control objects 71, 72, 73 and 74. It should be noted that at any appropriate time, any of the properties chosen for operator control may be deleted merely by pointing to the previously selected property in the scrollable list of FIG. 3B using the mouse control and clicking. This will deselect and turn the property off. Then the OK button 63 is clicked on, which changes the list of controllable properties accordingly and results in the deletion of the deselected property from control window 70 in FIG. 4.

Figure 5:
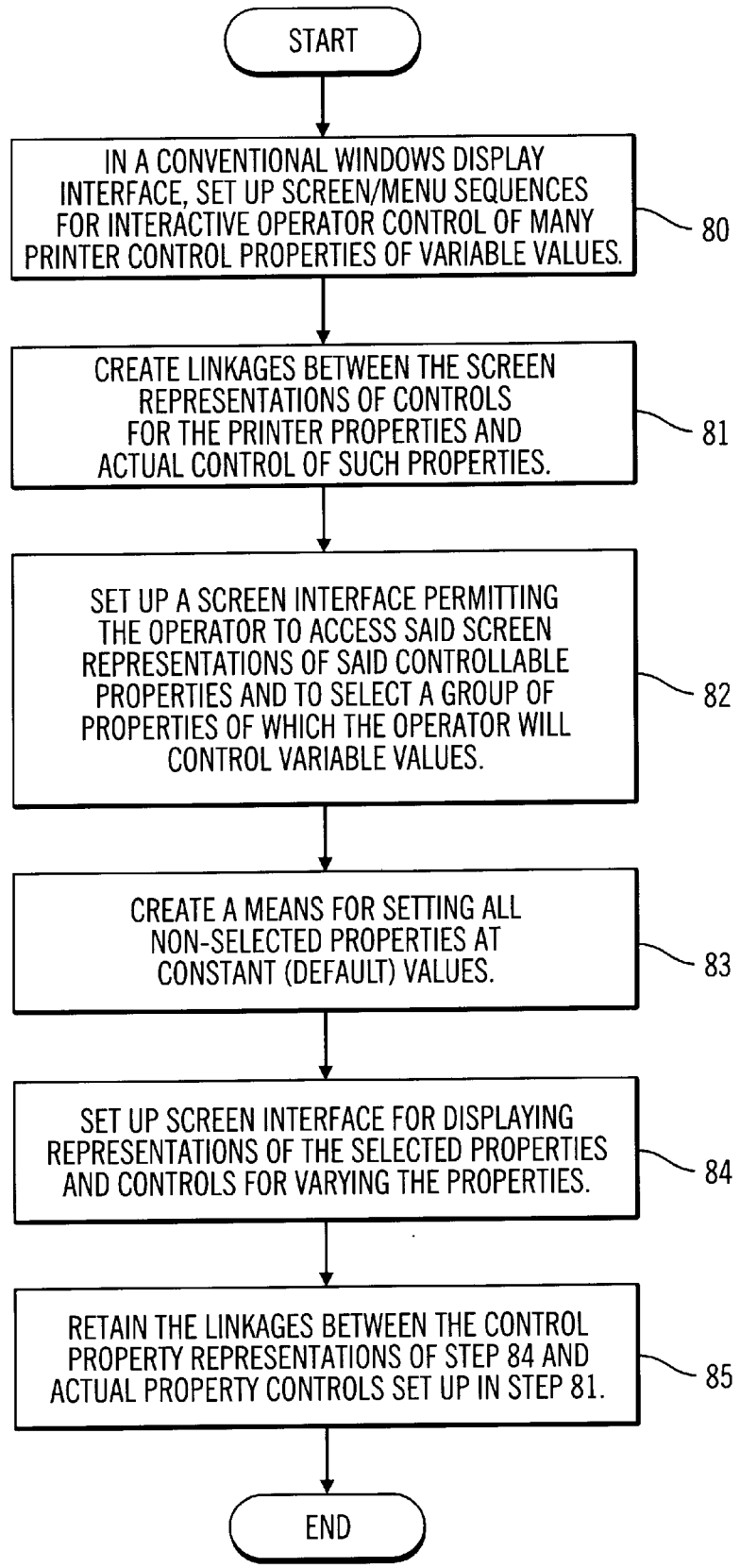
FIG. 5 is a flowchart showing the development of a program according to the present invention for interactively presenting selectable lists of operator controllable properties, permitting selection of such properties and providing an interactive control interface of only the selected properties.

Now with reference to FIG. 5, we will describe a process implemented by a program according to the present invention. The program involves the development of the display screen interfaces previously described with respect to FIGS. 2 though 4. In the flowchart of FIG. 5, a basic window interface is set up, step 80, whereby the operator may control printer properties, e.g. an interface like that of FIG. 2. Of course, appropriate conventional linkages are set up between representations of functions displayed on a screen, whether these representations be text or icons representative of the properties or other printer functions, and the properties or functions themselves, step 81. Then, step 82, a screen interface is set up to permit the operator to access screen representations of controllable properties and to select a more limited group of properties, the values of which will be variable and remain controllable by the operator. This presentation of selectable properties is the procedure described with respect to FIG. 3A, and the selection of the more limited group of variable properties remaining under operator control is described with respect to FIG. 3B. Then, step 83, means are created for setting the values of all of the nonselected properties at constant or default values. Next, step 84, a screen interface is set up for displaying (window 70 of FIG. 4) representations of the selected properties (Hold, Medium, Priority and Output bin, FIG. 4) and controls for varying the properties (controls 71 through 74, FIG. 4). Then, in step 85, linkages between the selected property representations, i.e. the text: "Hold, Medium, Priority and Output bin", FIG. 4 and the actual property controls set up in step 81 are retained for the four selected properties, and the development is complete.

Figure 6:
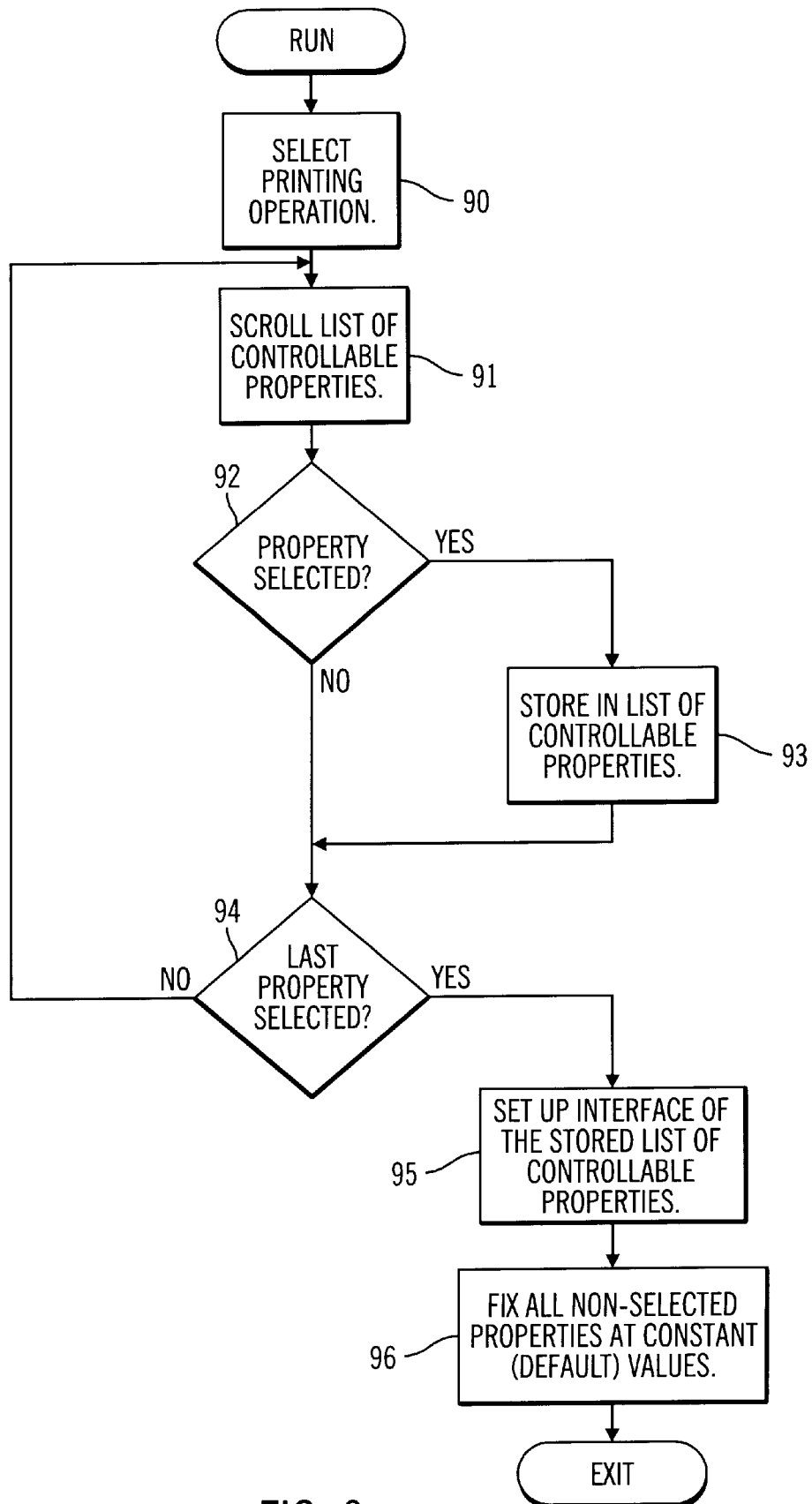
FIG. 6 is a flowchart showing the running of the program described with respect to FIG. 5.

Now that the basic programs have been described and illustrated, there will be described with respect to FIG. 6 a flow of a simple operation showing how the program could be run to produce a simplified display interface for operator control of a small group of properties selected to remain operator controllable while rendering all nonselected properties at fixed constant values, not operator controllable. First a given selected printing operation, step 90, is set up, e.g. Job 2 selected in the printer interface of FIG. 2. Next, step 91, a list of controllable printer properties is scrolled through, e.g. as in FIG. 3A. At each property in the scrolled list, a decision is made, step 92, as to whether that property has been selected. If Yes, then in step 93, that selected property is stored in a list of properties to remain controllable. Then, irrespective of the decision in step 92, a determination is then made as to whether the last property in the scrollable list has been selected. If No, then the process is returned to step 91, the list is scrolled to the next property and the process is continued. When the last selected property on the scrollable list has been decided upon, then, step 95, the OK button 63 in FIG. 3B is activated which sets up the interface in window 70, FIG. 4, so that the operator may control the operation or job by varying the selected properties. Also, step 96, all of the nonselected properties are set at constant or default values and rendered nonaccessible to the operator at the interface. This completes the interface set up. It should be noted that if the operator wishes to delete any of the properties chosen as controllable, he merely activates the interface of FIG. 3B. This presents him with scrollable list 60 with the controllable properties highlighted as shown. Then, as previously described, he may deselect the properties to be deleted from controllability, and activate OK button 63 to provide an updated properties control window 70 of FIG. 4.

The above embodiment has been described for a system in which the selected properties are scrolled to. The invention would be equally applicable to modify a system which uses an interface embodying a notebook/page metaphor for accessing properties. U.S. Pat. No. 5,515,497 covers a system with such an interface in which the user at the interface picks notebook tabs in response to which the notebook interface jumps to the particular page and selected property thereon. In applying the present invention to such a notebook arrangement, the notebook could be tabbed or flipped through and the properties which were to remain controllable selected. The rest of the properties would be set at fixed or default values and the operator would be given his own personal interface of the properties remaining controllable by him. This could still remain in a much smaller and easier notebook format with the constant properties out of sight.

While the present invention has been described using printer properties and operations as the illustrative example, the invention is equally applicable to the monitoring and control of properties in a wide variety of industrial, chemical and manufacturing production operations including the manufacturing of integrated circuits as well as automated tool and die production.

Although certain preferred embodiments have been shown and described, it will be understood that many changes and modifications may be made therein without departing from the scope and intent of the appended claims.

What is claimed is:

1. A data processor controlled display system for the interactive control of operations comprising:
   means for displaying a group of interactively controllable properties of said operations;
   means for selecting a plurality of said controllable properties for interactive operator control of variable property values during said operations;
   means for maintaining the nonselected properties at constant values during said operations; and wherein:
      said means for displaying said group of interactively controllable properties present representations of said properties in an interface having a notebook format with said representations of properties listed on pages; and
      said means for selecting said plurality of said properties interactively select said properties from the representations on said pages.

2. The data processor controlled display system of claim 1 further including a user interactive graphical display interface comprising:
   user controllable representations of each of said selected plurality of controllable properties.

3. The data processor controlled display system of claim 2 wherein said user interactive graphical display interface is without representations of said nonselected controllable properties.

4. The data processor controlled display system of claim 3 wherein each of said nonselected controllable properties is respectively maintained at a predetermined default value.

5. The data processor controlled display system of claim 3 wherein said system can select said plurality of said controllable properties for interactive operator control of variable property values while said production process is performed.

6. The data processor controlled display system of claim 5 wherein said production process is a printing process.

7. The data processor controlled display system of claim 1 wherein
   said means for displaying said group of interactively controllable properties present representations of said properties in a scrollable graphical interface, and
   said means for selecting said plurality of said properties interactively select said properties from the representations in said scrollable interface.

8. In a data processor controlled display system, a method for the interactive control of operations comprising:
   displaying a group of interactively controllable properties of said production operations;
   enabling the selection of a plurality of said controllable properties for interactive operator control of variable property values during said operations;
   maintaining the nonselected properties at constant values during said operations; and wherein:
      said step of displaying said group of interactively controllable properties presents representations of said properties in an interface having a notebook format with said representations of properties listed on pages, and
      said step of selecting said plurality of said properties interactively selects said properties from the representations on said pages.

9. The method of claim 8 including the further step of selecting a plurality of said controllable properties for interactive operator control of variable property values during said operations.

10. The method of claim 8 further including the step of providing a user interactive graphical display interface comprising user controllable representations of each of said selected plurality of controllable properties.

11. The method of claim 10 wherein said user interactive graphical display interface is without representation of said nonselected controllable properties.

12. The method of claim 11 wherein each of said nonselected controllable properties is respectively maintained at a predetermined default value.

13. The method of claim 11 wherein said system can select said plurality of said controllable properties for interactive operator control of variable property values while said production process is performed.

14. The method of claim 13 wherein said production process is a printing process.

15. The method of claim 8 wherein:
   said step of displaying said group of interactively controllable properties presents representations or said properties in a scrollable graphical interface; and
   said step of selecting said plurality of said properties interactively selects said properties from the representations in said scrollable interface.

16. A computer controlled display program having program code included on a computer readable medium for the interactive control of operations comprising:
   means for displaying a group of interactively controllable properties of said operations;
   means for enabling the selection of a plurality of said controllable properties for interactive operator control of variable property values during said operations;
   means for maintaining the nonselected properties at constant values during said operations; and wherein:
      said means for displaying said group of interactively controllable properties present representations of said properties in an interface having a notebook format with said representations of properties listed on pages; and
      said means for enabling the selection of said plurality of said properties interactively select said properties from the representations on said pages.

17. The program of claim 16 further including a user interactive graphical display interface comprising:
   user controllable representations of each of said selected plurality of controllable properties.

18. The program of claim 16 wherein said user interactive graphical display interface is without representations of said nonselected controllable properties.

19. The program of claim 18 wherein each of said nonselected controllable properties is respectively maintained at a predetermined default value.

20. The program of claim 19 wherein said system can select said plurality of said controllable properties for interactive operator control of variable property values while said production process is performed.

21. The program of claim 20 wherein said production process is a printing process.

22. The program of claim 16 wherein:
   said means for displaying said group of interactively controllable properties present representations of said properties in a scrollable graphical interface; and
   said means for enabling the selection of said plurality of said properties interactively select said properties from the representations in said scrollable interface.

* * * * *